US011873146B1

(12) United States Patent
Gonzalez

(10) Patent No.: US 11,873,146 B1
(45) Date of Patent: Jan. 16, 2024

(54) CHILD SAFETY DEVICE FOR MEDICATION DISPENSER

(71) Applicant: Jose Gonzalez, San Antonio, TX (US)

(72) Inventor: Jose Gonzalez, San Antonio, TX (US)

( * ) Notice: Subject to any disclaimer, the term of this patent is extended or adjusted under 35 U.S.C. 154(b) by 48 days.

(21) Appl. No.: 17/870,094

(22) Filed: Jul. 21, 2022

(51) Int. Cl.
*B65D 50/04* (2006.01)
*A61J 7/04* (2006.01)
*B65D 83/04* (2006.01)

(52) U.S. Cl.
CPC .............. *B65D 50/041* (2013.01); *A61J 7/04* (2013.01); *B65D 83/0409* (2013.01); *A61J 7/0481* (2013.01); *A61J 2205/40* (2013.01)

(58) Field of Classification Search
CPC ...... B65D 50/041; B65D 83/0409; A61J 7/04; A61J 7/0481; A61J 2205/40
See application file for complete search history.

(56) References Cited

U.S. PATENT DOCUMENTS 6,082,358 A * 7/2000 Scarrott .............. A61M 15/002 128/200.14
7,408,843 B2 * 8/2008 Brandon ............... A61J 7/0472 368/10
8,689,988 B2 * 4/2014 Xu ............................ A61J 7/04 215/206
10,238,579 B2 * 3/2019 Zonana ................. A61J 7/0418
10,905,632 B1 * 2/2021 Gonzalez .................. A61J 7/04
2008/0149638 A1 * 6/2008 Van Hees ............ B65D 47/265 220/360
2009/0101644 A1 * 4/2009 Maiwald ................ B65D 51/18 220/254.1
2010/0084397 A1 * 4/2010 Kubo ................. B65D 51/1633 220/256.1
2010/0307208 A1 12/2010 Corbin
2013/0043204 A1 2/2013 Simpson
2014/0001182 A1 * 1/2014 Wood ...................... B65D 41/58 220/254.1
2014/0291279 A1 * 10/2014 Robertos ................... A61J 1/03 215/365
2016/0253477 A1 * 9/2016 Xu ........................ A61J 7/0076 340/687
2017/0079886 A1 * 3/2017 Sagynaliev ........... A61J 1/1418

* cited by examiner

*Primary Examiner* — Michael Collins
(74) *Attorney, Agent, or Firm* — Sanchelima & Associates PA; Christian Sanchelima; Jesus Sanchelima

(57) ABSTRACT

A child safety device for medication dispenser including a bottom cap assembly, a top cap assembly. The bottom cap assembly is secured on top of a medication dispenser such as prescription bottles. The bottom cap assembly further includes pawls and a lever lock. On a top surface, the bottom cap includes at least one dosing aperture and dosage regimen indicia. The top cap assembly includes a top cap having an internal ratchet gear that, when mounted upon the bottom cap assembly, interacts with the pawls to permit rotation in only one direction. The top cap further includes stops that are configured to affix the top cap in predetermined positions. The present invention has a 2-step process, by depressing the arm lever to disengage it along the ratchet and pawl system. The user would then twist to move the cap to its respective indicia for its desired scheduling or to their dispensing opening.

16 Claims, 11 Drawing Sheets

CHILD SAFETY DEVICE FOR MEDICATION DISPENSER

BACKGROUND OF THE INVENTION

1. Field of the Invention

The present invention relates to a child safety device for medication dispenser and, more particularly, to a child safety device for medication dispenser that includes an internal locking mechanism that forestalls the dispenser to be opened by underaged.

2. Description of the Related Art

Several designs for dosage caps have been designed in the past. None of them, however, include a top cap that rotates about a pivot. The top cap is internally engaged by a ratchet gear and pawls to permit it to rotate only in one direction while including internal stops that affix the top cap in predetermined positions. A push button is located on a base portion of the present invention to disengage a lever arm from one of the stops and permit the top cap to keep rotating until the lever arm hits another stop.

Applicant believes that a related reference corresponds to U.S. patent application No. 2010/0307208 for locking pill bottle. Applicant believes that another related reference corresponds to U.S. patent application No. 2013/0043204 for a lockable cap for a bottle. However, none of the of the references teach a child safety device for medication dispenser having an internal interaction of a ratchet gear with pawls that permit a top cap to rotate in only one direction while including a lever lock that affix the top cap in an opened or closed configuration so that the content of the medication dispenser is confined therewithin or delivered. The present invention also includes indicia that informs the time of day in which medication was last accessed.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a child safety device for medication dispenser that includes indicia to call for a twice daily administration schedule.

It is another object of this invention to provide a child safety device with a ratchet and pawl mechanism to work on existing retail and commercial medication pill and pharmacy containers/bottles.

It is another object of the present invention to provide a child safety device for medication dispenser that reduces the number of capsules/tablets being dispensed at a single attempt in contrast with the current way of uncapping the lid to pour out tablets/capsules.

It is another object of the present invention to provide a child safety device for medication dispenser that reduces cross contamination of capsules/tablets by reducing the amount of medication poured out at any one single attempt.

It is another object of this invention to provide a child safety device for medication dispenser that solely rotates clockwise to keep a constant displaying of the current indicia that corresponds to the last time the cap was opened.

It is still another object of the present invention to provide a child safety device for medication dispenser that allows users to make four different stops throughout the rotation of the cap.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
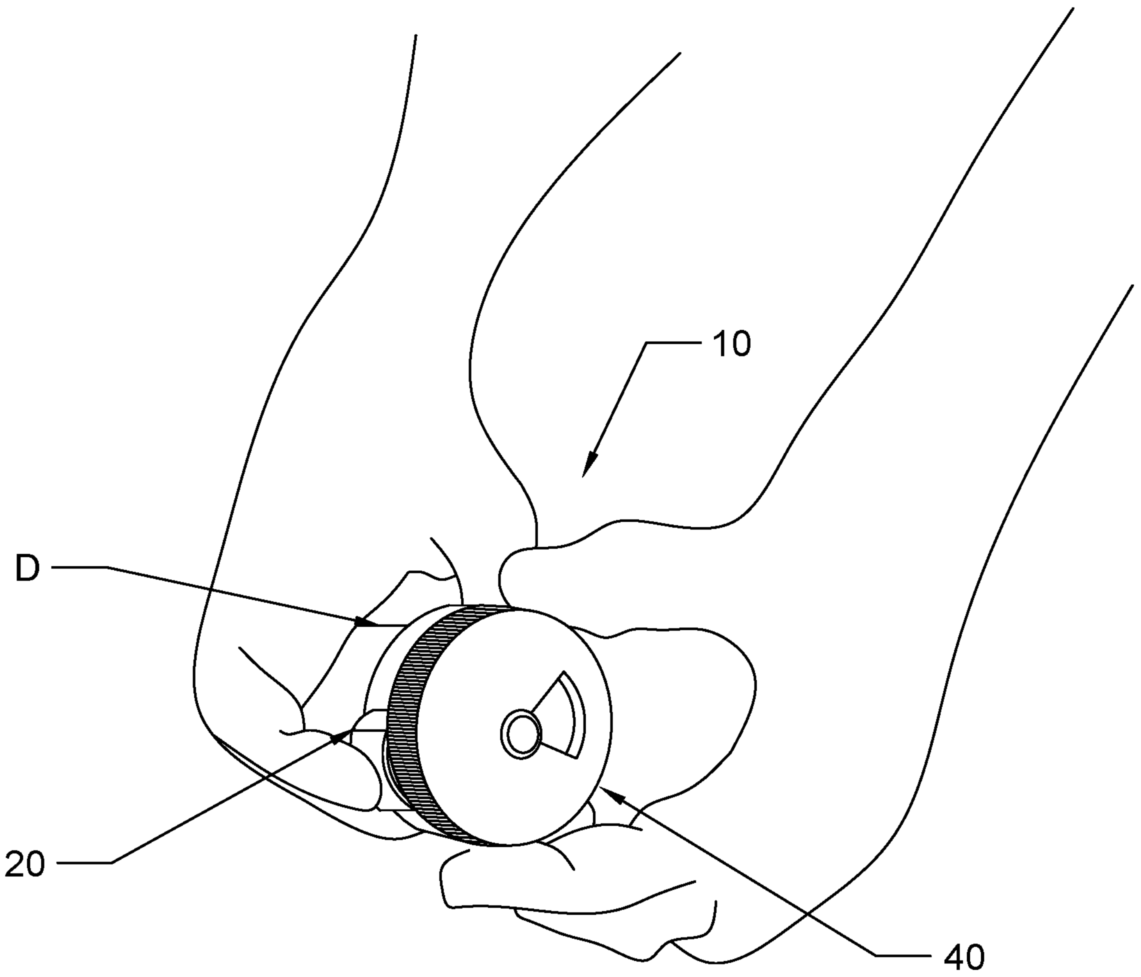
FIG. 1 represents an operational view according to an exemplary embodiment of the present invention 10.

Referring now to the drawings, where the present invention is generally referred to with numeral 10, it can be observed that it basically includes a bottom cap assembly 20, a top cap assembly 40, a pivot tip assembly 60, and various exemplary embodiments (100, 200, 300) thereof. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
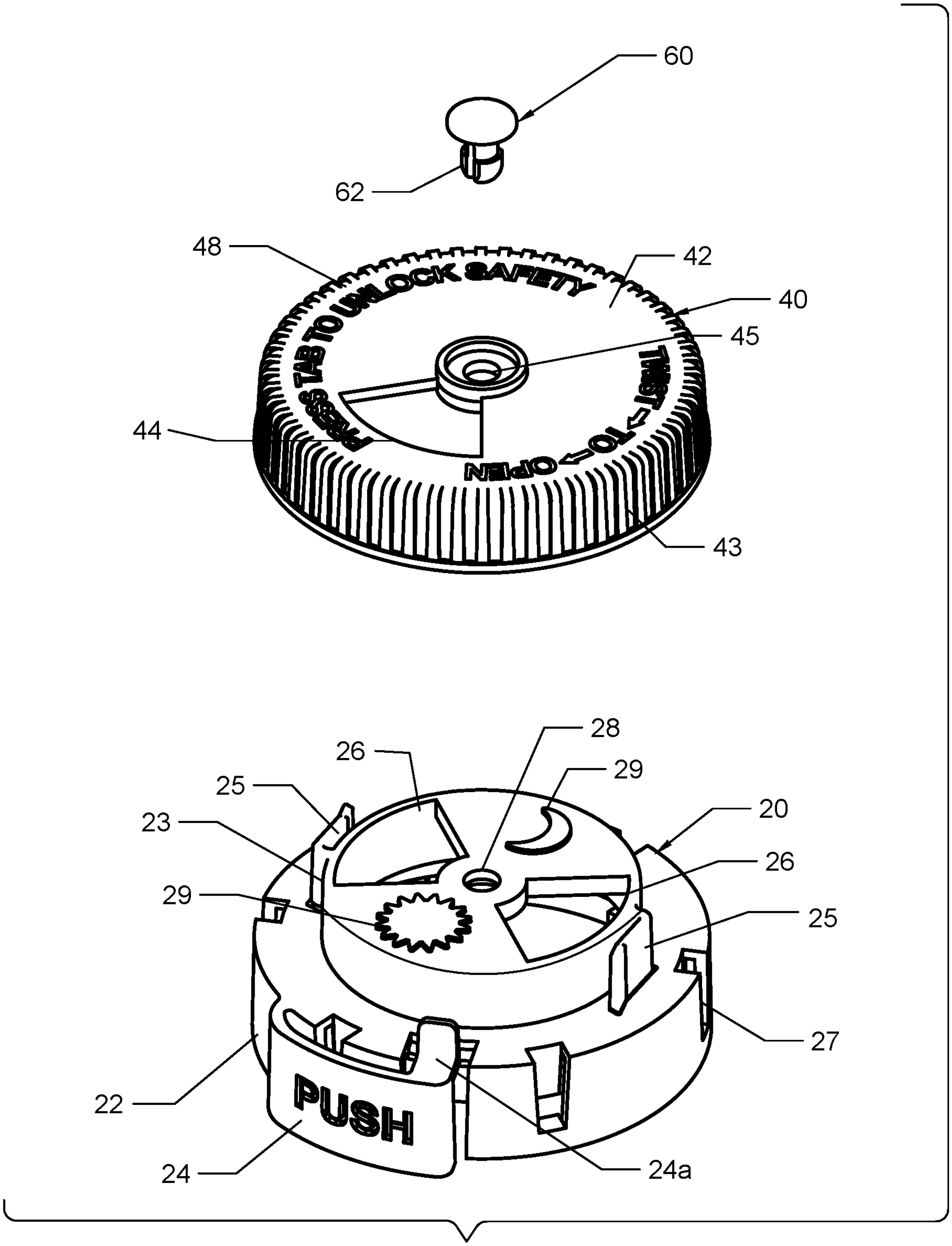
FIG. 2 shows an exploded view of the bottom cap assembly 20, the top cap assembly 40, and the pivot tip assembly 60 in accordance with an exemplary embodiment 10 of the present invention.

Best illustrated in FIG. 1 in one embodiment of the present invention, the bottom cap assembly 20 is volumetrically suitable to receive a medication dispenser D such as prescription bottles and be removably attached thereto. The present invention 10 is capable of presenting various sizes/geometries to be attached to existing retail pharmacy pill bottles/containers as known in the art. The bottom cap assembly 20 may be made of a lightweight, durable and resistant material. In a suitable embodiment, the bottom assembly 20 may be made of acrylic, polycarbonate, polyethylene, polypropylene, polyethylene terephthalate, polyvinyl chloride, acrylonitrile-butadiene-styrene, or any other suitable polymer as known in the art to manufacture bottle caps. However, in other embodiments, the bottom cap assembly 20 may be made of other suitable materials such as natural or synthetic fibers, metals, woods, ceramics, and/or any variation thereof. The bottom cap assembly 20 includes a base portion 22 and an upper portion 23. The base portion 22 may have a shape that conforms with the shape of the bottle that is to be attached to. In a suitable embodiment, the base portion 22 may have a cylindrical shape. In other embodiments, the base portion 22 may have any other suitable shape such as oval shape and/or the like. The base portion 22 being circular may have a predetermined diameter. The base portion 22 may have slots 27 about an external surface, wherein each slot may have a rectangular shape and may be separated from one another by a predetermined distance. The base portion 22 may include a push button 24 that may have indicia on a front surface that conveys the message "PUSH". The push button 24 may extrude outwardly from the base and then extends parallel with respect to the external surface of the base portion 22 as shown in FIG. 2. The push button 24 further includes an upward-facing lever arm 24*a* located on a distal end thereof opposite to the section that connects the push button 24 with the base portion 22. The Push button 24 may be flexible, so that a user may be able to press it towards the base portion 22 and consequently move the lever arm 24*a*.

Figure 3:
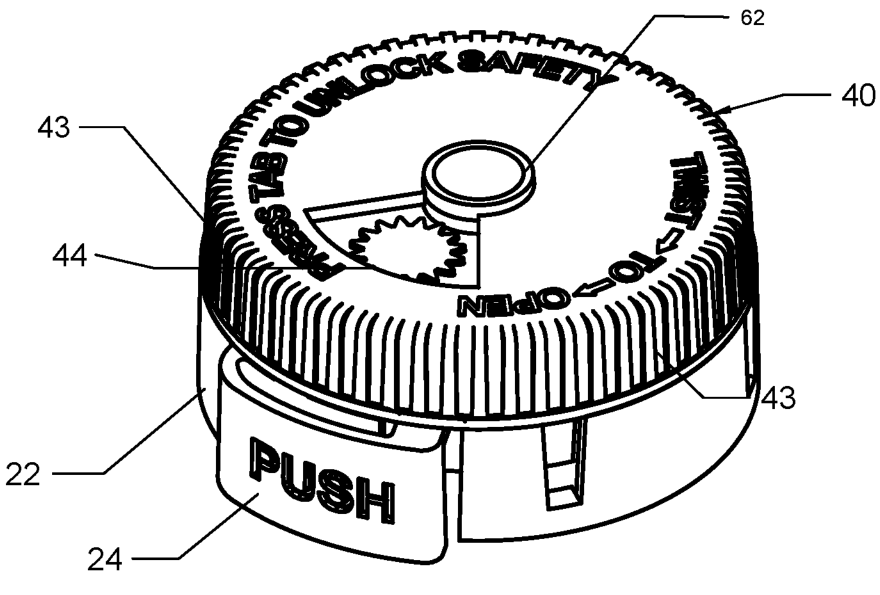
FIG. 3 shows an exemplary configuration of the present invention where the sun indicia is visible.
Figure 4:
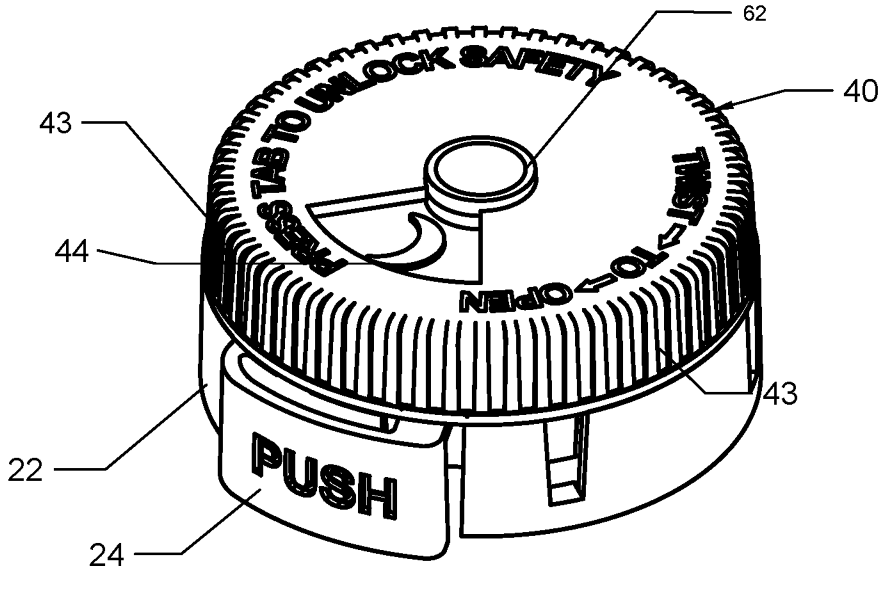
FIG. 4 shows an exemplary configuration of the present invention where the moon indicia is visible.

As shown in FIG. 2, the upper portion 23 may be located on top of the base portion 22. In one embodiment, the upper portion 23 may be cylindrical. However, in other embodiments, the upper portion 23 may have different suitable shapes. In one embodiment, the base portion 24 and the upper portion 23 may be concentrical. The upper portion 23 being circular at its base, may have a predetermined diameter that me be smaller than the diameter exhibited by the base portion 22. The upper portion 23 may include pawls 25 disposed about its periphery. The pawls 25 may be located at opposite ends. The pawls 25 may face opposite directions. On a top surface, the upper portion 23 may include at least one dosing aperture 26 around a central opening 28. In an exemplary embodiment, the at least one dosing aperture 26 may be located 180 degrees across from one another. The central opening 28 may have a suitable shape to receive the pivot tip assembly 60. Upon said top surface, the upper portion 23 displays a dosage regimen indicia 29. In an exemplary embodiment, the dosage regimen indicia 29 may be located 180 degrees across from one another and with a 90 degree offset with respect to the at least one dosing aperture 26. In one embodiment, the dosage regimen indicia 29 may be a pictorial representation of a moon and a sun, intended to inform the user a medication dose must be taken at day/night time as shown in FIGS. 3-4 wherein the sun/moon shaped dosage regimen indica 29 is visible. In other embodiments, the dosage regimen indicia may be any other suitable pictorial representation that conveys different day times. In a suitable embodiment, the dosage regimen indicia may be interleaved with the at least one dosing aperture upon the top surface.

Better depicted in FIG. 2 the top cap assembly 40 may be volumetrically suitable to be inserted on the upper portion 23 of the bottom cap assembly 20 as further shown in FIG. 4 wherein both assemblies (20 and 40) are assembled. In one embodiment, the top cap assembly 40 may be made of a lightweight, durable and resistant material. In a suitable embodiment, the top cap assembly 40 may be made of acrylic, polycarbonate, polyethylene, polypropylene, polyethylene terephthalate, polyvinyl chloride, acrylonitrile-butadiene-styrene, or any other suitable polymer as known in the art to manufacture bottle caps. However, in other embodiments, the top cap assembly 40 may be made of other suitable materials such as natural or synthetic fibers, metals, woods, ceramics, and/or any variation thereof. The top cap assembly 40 further includes a top cap 42 that has a lateral wall 43 that may exhibit a series of ridges disposed perpendicularly that follow a circular pattern. On an uppermost surface, the top cap 42 may include a dispensing opening 44 having a shape that conforms with the shape of the at least one dosing aperture 26. About a periphery of the uppermost surface, the top cap 42 may include indicia 48 that may inform a user of how to properly use the present invention 10. In one embodiment, the indicia 48 indicates a message such as "PRESS TAB TO UNLOCK SAFETY", "TWIST TO OPEN". However, in different embodiments, the indicia may display different messages and/or in different languages as known in the art and that are related to the invention disclosed herein. The top cap 42 further includes a top opening 45 having a circular shape that is disposed on a center position thereof. When assembled, the top opening 45 may be flush with the central opening 27. The top cap 42 further includes a circular wall 45*a* that surrounds the top opening 45 and that protrudes outwardly with respect to the uppermost surface. A distal end of the dispensing opening 44 may be in abutting contact with the circular wall 45*a*.

As illustrated in FIG. 2, the pivot assembly 60 includes a pivot tip 62 which is an element used to movably secure the top cap assembly 40 with bottom cap assembly 60 while acting as an axle about which the top assembly 40 may rotate. In an exemplary embodiment, the pivot tip 60 may consist of a shaft of varying diameter with a head attached to a distal end thereof. In one embodiment, the shaft may be volumetrically suitable to be inserted through both the top opening 45 and the central opening 27. Once inserted, the head of the pivot tip 62 may be volumetrically suitable to be enclosed by the circular wall 45.

Figure 5:
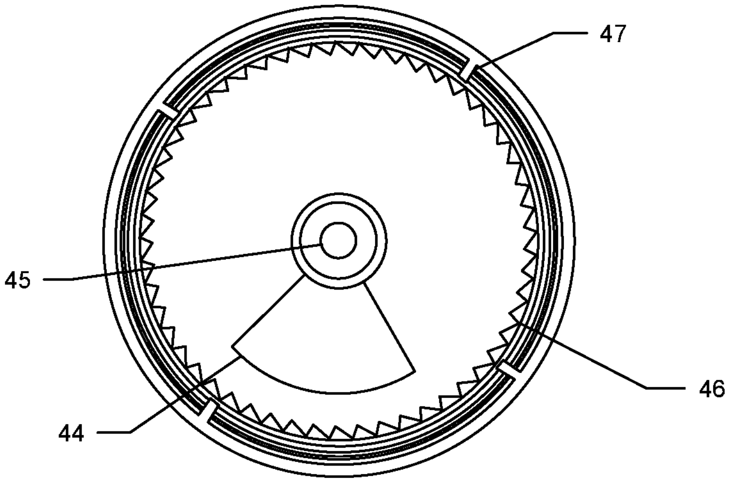
FIG. 5 illustrates a bottom view of the top cap 42 having a top opening 45, a ratchet gear 46, stops 47, and a dispensing opening 44 in accordance with an exemplary embodiment 10 of the present invention.
Figure 6:
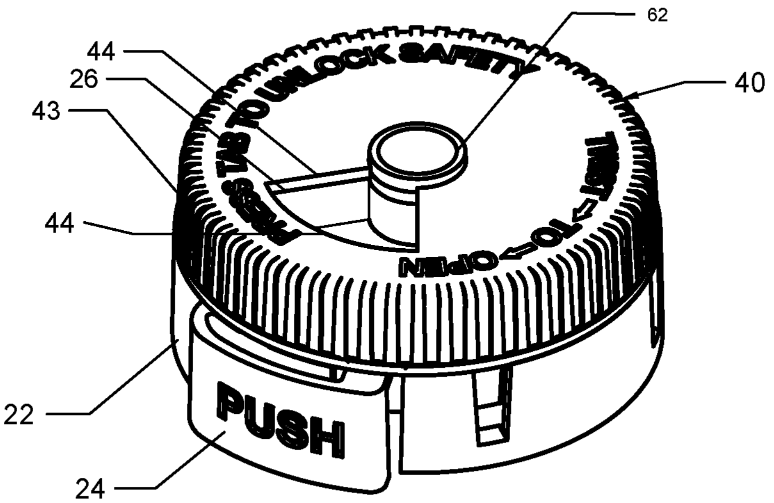
FIG. 6 is a representation of a top isometric view of the bottom cap assembly 20 secured to the top cap 42 by means of the pivot tip 62 in accordance with an exemplary embodiment 10 of the present invention.

Referring now to FIG. 5 which is a bottom planar view of an exemplary embodiment of the top cap assembly 40, it can be seen that the top cap 42 may be hollow. About an interior surface of the lateral wall 43, the top cap 42 may include a ratchet gear 46. In one embodiment, the ratchet gear 46 may be a gear type that, due to its geometry, may permit rotation solely in one direction. The ratchet gear 46 may have teeth that exhibit one side with a steep slope and another being substantially perpendicular with respect to its base. In a suitable embodiment, the ratchet gear 46 may only permit clockwise rotation. Nonetheless, in other embodiments, the ratchet gear 46 may only permit counterclockwise direction. The ratchet gear 46 is not disclosed herein in depth as it is a mechanical element widely known in the art. Additionally, the top cap 42 may present stops 47 disposed on predetermined arrangements about the internal periphery thereof. In a suitable embodiment, each stop may be related to the at least one dosing aperture 26 and the dosage regimen indicia 29. In one embodiment, the dosage regimen indicia 29 may be comprised of two pictorial representations (a sun and a moon), and the at least one dosing aperture 26 may include two dosing apertures, thus there may be four stops associated with each of the aforementioned elements. In other embodiments, the number of stops 47 may be directly related to the number of at least one dosing aperture 26 and dosage regimen indicia 29. The stops 47 may be internal structural limitations that protrudes inwardly a predetermined distance to provide a hindrance.

Figure 7:
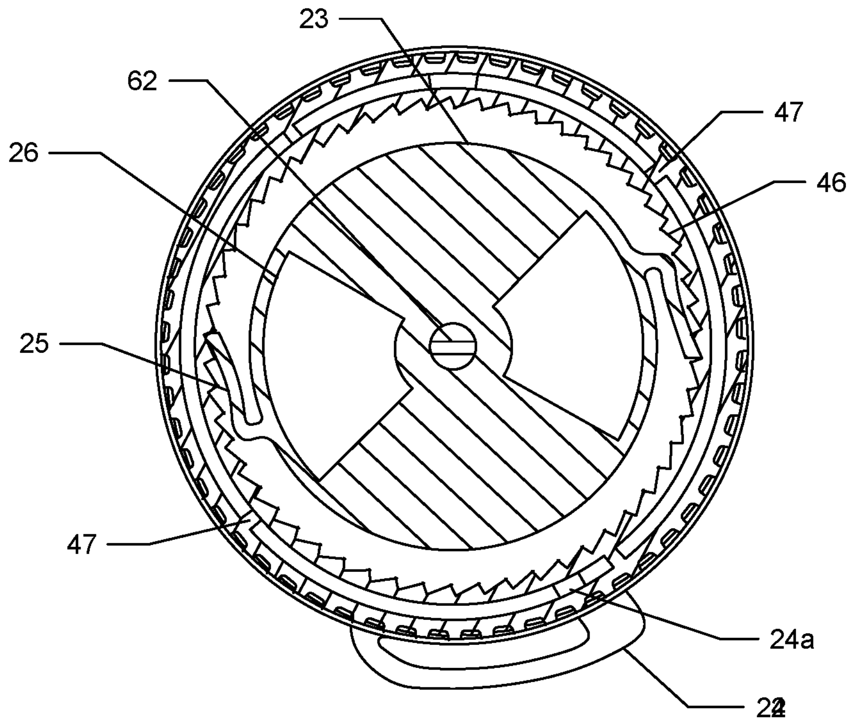
FIG. 7 shows a bottom perspective view of the interaction of the bottom cap assembly 20 with the top cap assembly 40 when ensembled in accordance with an exemplary embodiment of the present invention.

When the top cap assembly 40 is secured with the bottom cap assembly 20 by means of the pivot assembly 60 there may be an internal interaction of elements that permit the present invention 10 to be locked at predetermined positions and unlocked when a user disengages the internal mechanisms by means of the push button 24. Additionally, as the top cap 42 may enclose the upper portion 23, the elements present in the upper portion, such as the at least one dosing aperture 46 and the dosage regimen indicia 29, may align with the dispensing opening 44 at predetermined positions thereof when rotating. In one embodiment, where one of the at least one dosing aperture 46 aligns with the dispensing opening 44, an opened configuration is defined. When one of the dosage regimen indicia 29 aligns with the opening 43 a closed configuration is defined. As shown in FIG. 7, when both the cap assembly 40 and the bottom cap assembly 20 are ensembled, the pawls 25 may interact with the ratchet gear 46 so that each pawl, when rotated in the allowed direction, may slide over the teeth. On the other hand, when the top cap 42 is rotated in the blocked direction, the pawls 25 may be stopped by the more perpendicular side of the teeth of the ratchet gear 46 as illustrated in FIG. 7. When ensembled, the lever arm 24*a* may be enclosed by the top cap 42. The lever arm 24*a* is configured to interact with the stops 47. As the ratchet gear 46 in conjunction with the pawls 25 may permit the top cap 42 to rotate in a predetermined direction, be it clockwise for explanatory purposes, it may be needed a sort of stopping mechanism that permits the top cap 42 to stop at opened configuration or at closed configuration. In an explanatory embodiment, where the assemblies 20, 40, and 60 are secured together and attached to a prescription bottle (or the like), the base and upper portion (22, 23) may be fixed while the top cap 42 may be movable. In this embodiment, the ratchet gear 46 may permit clockwise rotation. A user may rotate to top cap 42 clockwise until the lever arm 24*a* may hit one of the stops 47, in such case the stop 47 may impede the top cap to rotate clockwise while the ratchet gear 46 in conjunction with the pawls 25 may impede the top cap 42 to rotate counterclockwise, at this point, the present invention may be in one of the opened or closed configuration. In order to rotate keep rotating the top cap 42, the user may disengage the lever arm 24*a* from one of the stops 47 by pressing the push button 24 inward, thereby the top cap 42 may be able to keep rotating until the lever arm 43 may collide with one of the stops 47. In one embodiment, when the dispensing opening 44 may be aligned with one of the at least one dosing aperture 26, medication can be dispensed by inverting the prescription bottle. The dispensing opening 44 may also permit the dosage regimen indicia 29 (be it a sun and a moon for explanatory purposes) to be visible when the present invention is in closed configuration, thereby can be used to record the time of day the medication was last accessed.

Figure 8:
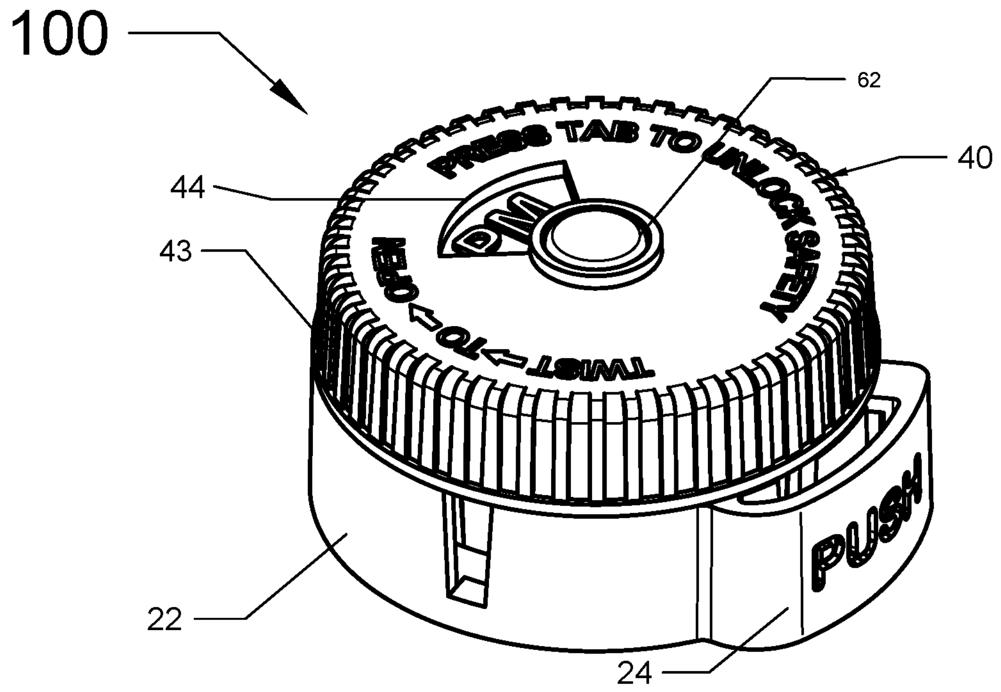
FIG. 8 shows an isometric view of the present invention in accordance with exemplary embodiment 100.
Figure 8A:
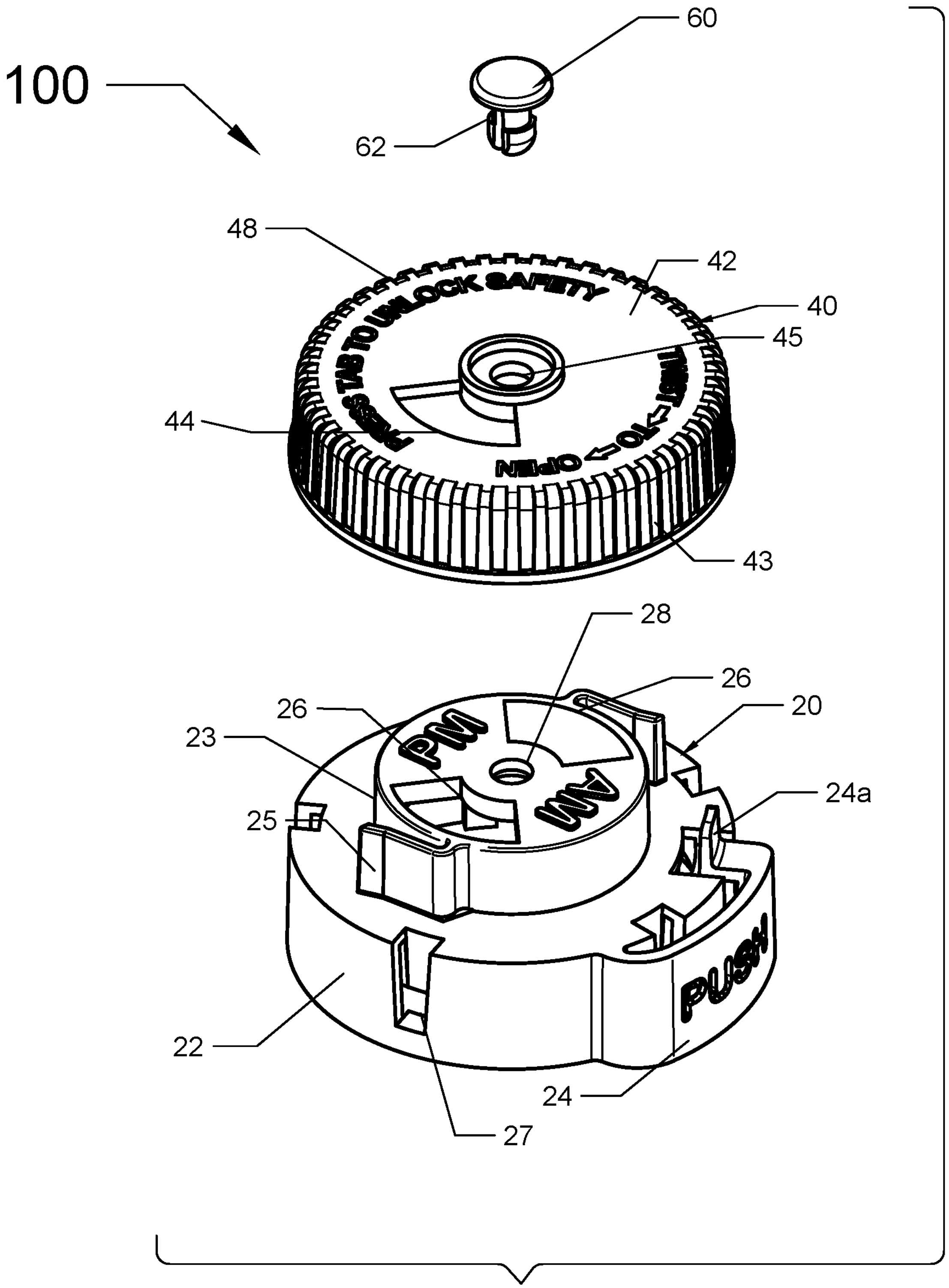
FIG. 8A shows an exploded view of the bottom cap assembly 20, the top cap assembly 40, and the pivot tip assembly 60 in accordance with an exemplary embodiment 100 of the present invention.
Figure 8B:
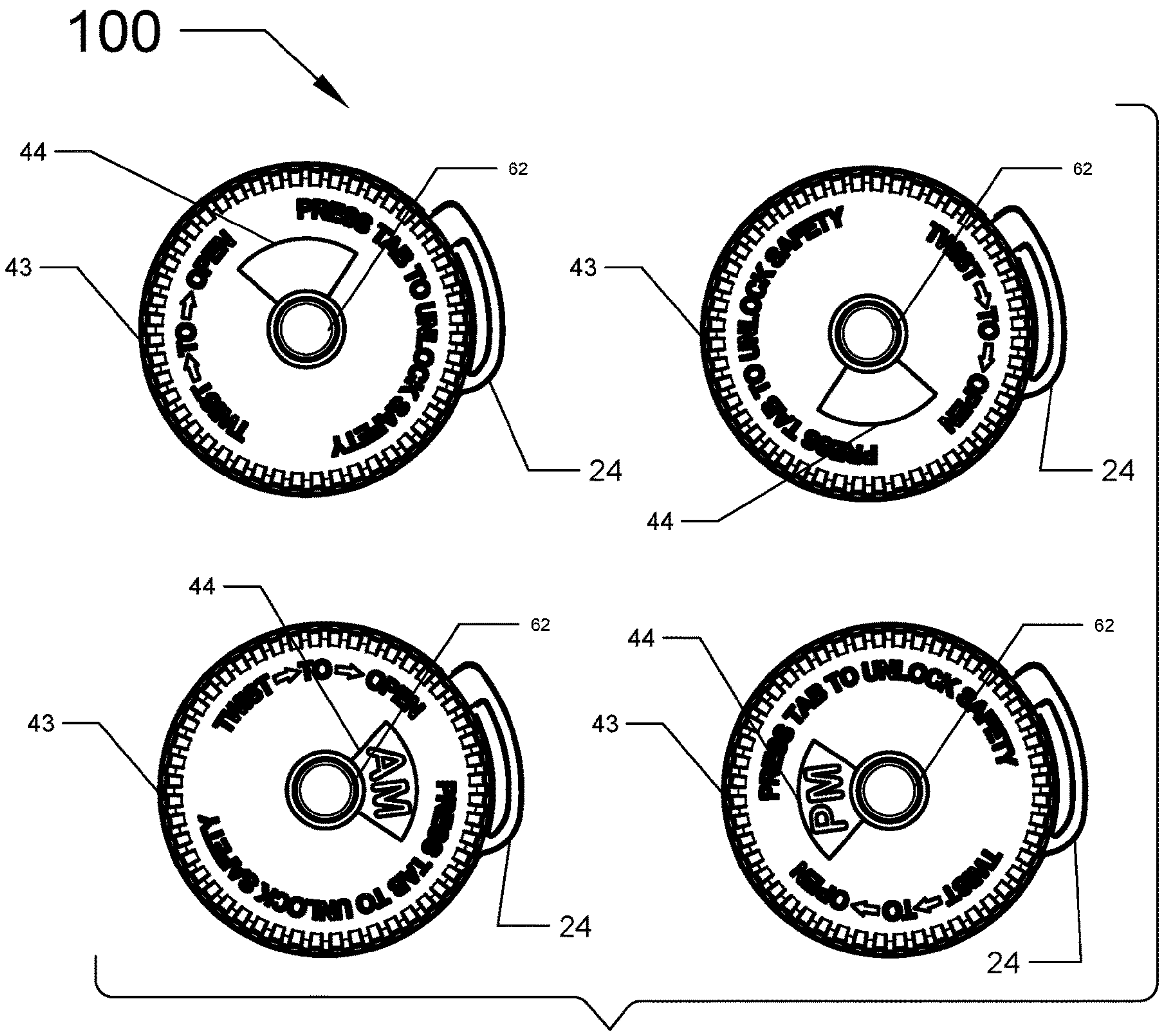
FIG. 8B shows the various configurations of the present invention in accordance with exemplary embodiment 100.

Exemplary embodiment 100 illustrated in FIGS. 8-8B present a variation of the present invention. As depicted in FIG. 8A the present exemplary embodiment 100 teaches the pivot assembly and the top cap assembly (60, 40) as described previously with a variation in the dosage regimen indicia shown upon the upper portion 23. In the present exemplary embodiment, the dosage regimen indicia 29 is presented as an "AM"/"PM" pictorial representation to indicate dosage frequency. The present exemplary embodiment 100 presents no variations in regard to the mechanical interaction between the stops 47 with the lever arm 24*a* and the pawls 26 with the ratchet gear 46. The present exemplary embodiment 100 may exhibit a closed configuration, in which one of the AM/PM indicia is visible, and an opened in which the openings (26, 44) are aligned to retrieve medicament stored within the dispenser D. FIG. 8B presents both opened and closed configurations of the present exemplary embodiment 100.

Figure 9:
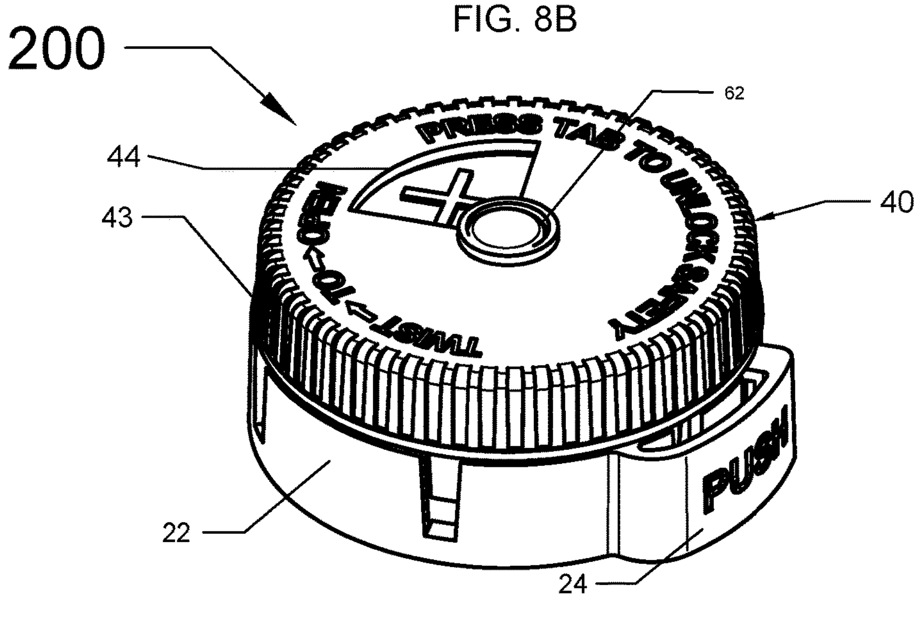
FIG. 9 illustrates an isometric view of the present invention in accordance with exemplary embodiment 200.
Figure 9A:
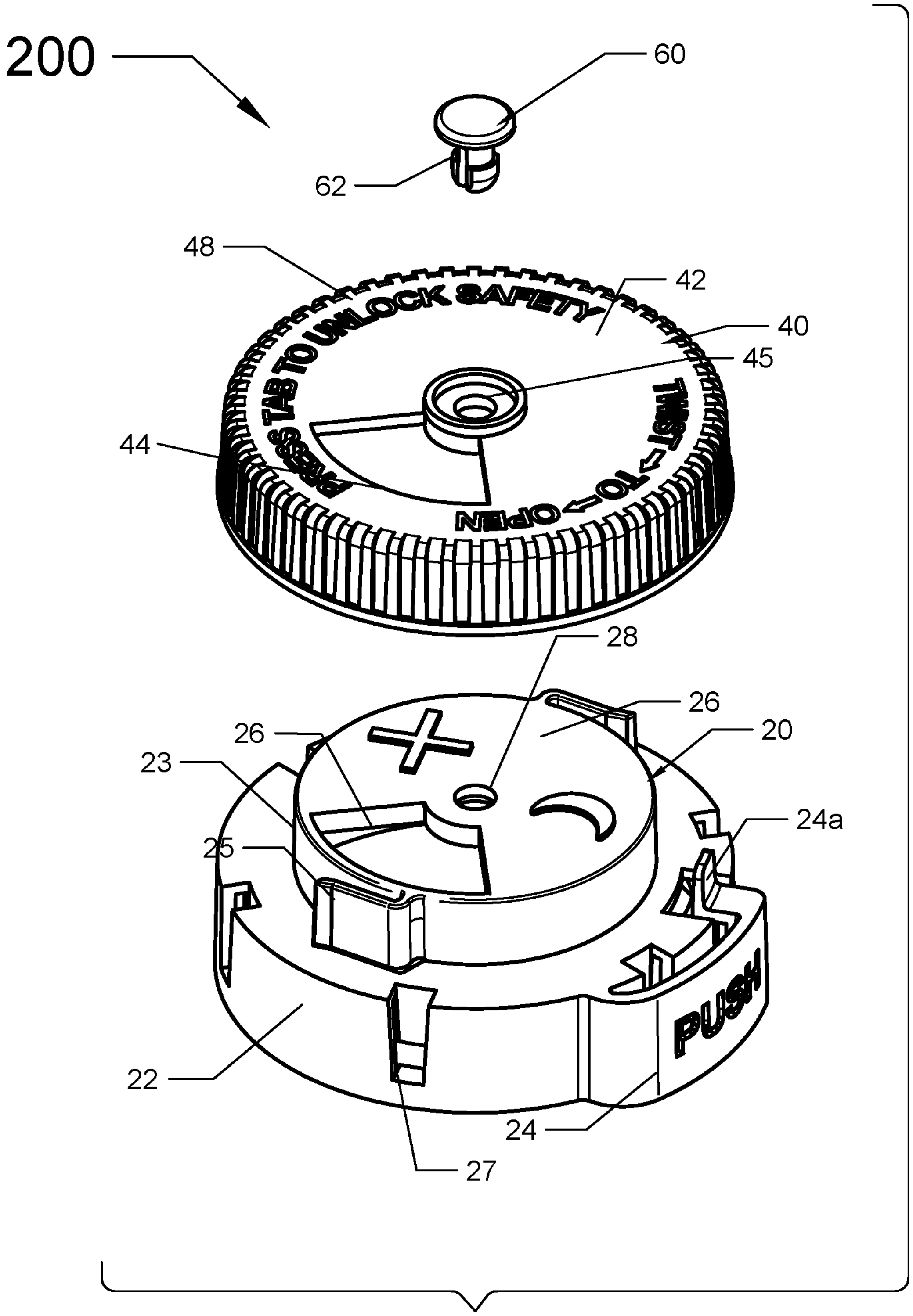
FIG. 9A depicts an exploded view of the bottom cap assembly 20, the top cap assembly 40, and the pivot tip assembly 60 in accordance with an exemplary embodiment 200 of the present invention.
Figure 9B:
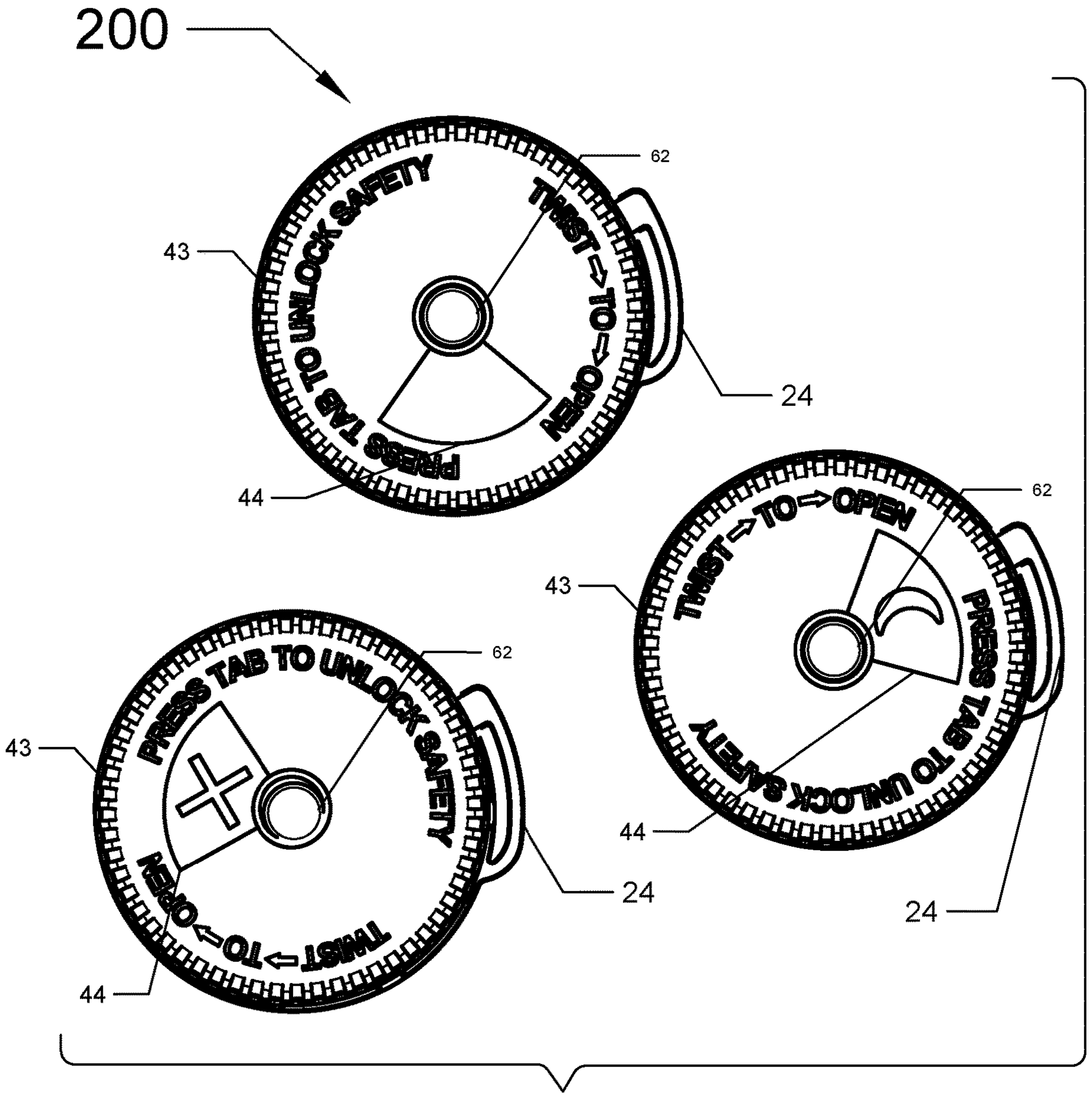
FIG. 9B shows the various configurations of the present invention in accordance with exemplary embodiment 200.

FIGS. 9-9B illustrate exemplary embodiment 200 of the present invention. As depicted in FIG. 9, the present embodiment shows the aforementioned pivot assembly 60 and the top cap assembly 40 and a variation of the bottom cap assembly 20. The bottom cap assembly in the present embodiment 200 presents only one dosing aperture 26 and the dosage regimen indicia 29 in the shape of a moon and an x. In the present exemplary embodiment 200 the child safety device for medication dispenser indicates the last time the bottle was opened by displaying the moon indicia, or by displaying an "X" that indicates to users that they have already accessed the medication that day. By including one dosing aperture 26, a moon-shaped indicia and an x-shaped indicia, the present exemplary embodiment 200 exhibits two closed configurations and one opened configuration as shown in FIG. 9B.

Figure 10:
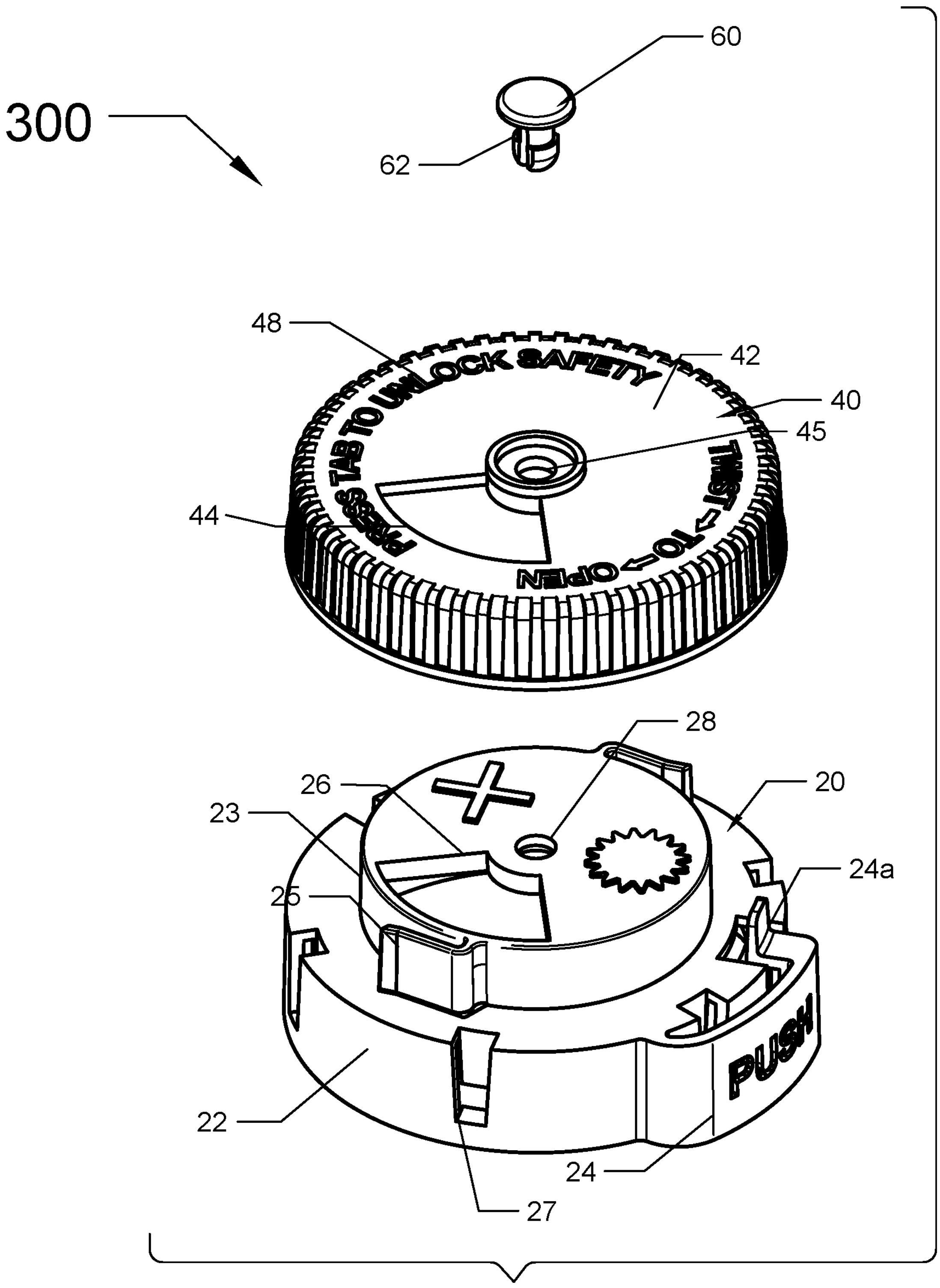
FIG. 10 depicts an exploded view of the bottom cap assembly 20, the top cap assembly 40, and the pivot tip assembly 60 in accordance with an exemplary embodiment 300 of the present invention
Figure 10A:
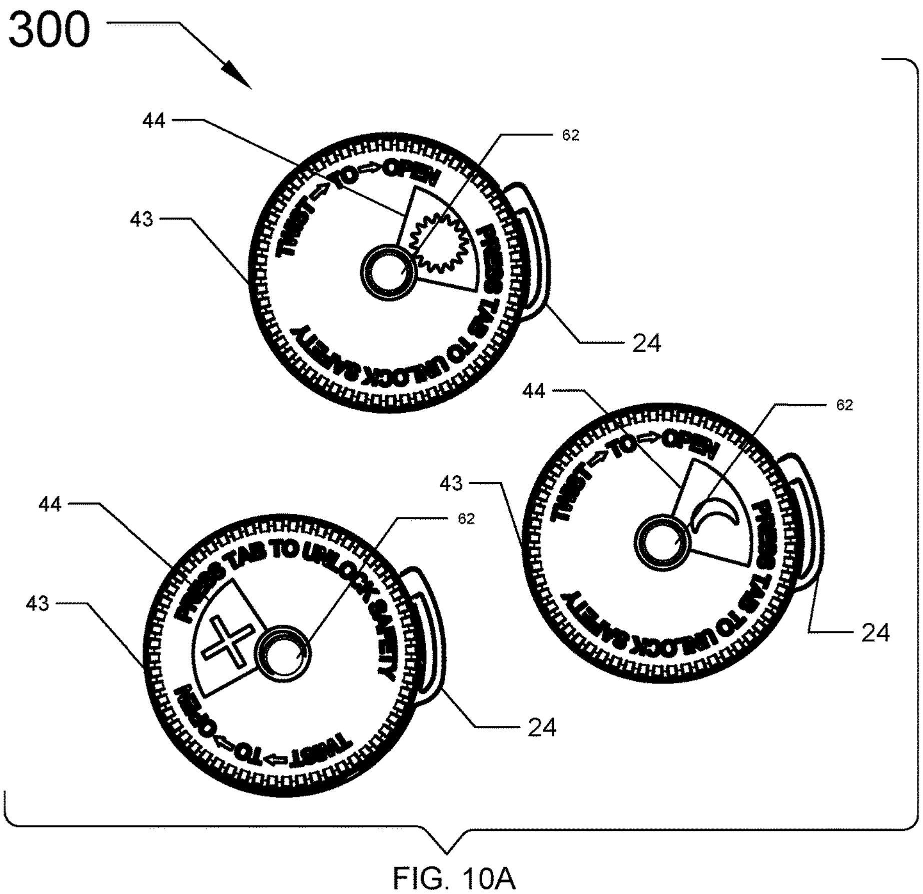
FIG. 10A shows the various configurations of the present invention in accordance with exemplary embodiment 300

FIGS. 10-10A show exemplary embodiment 300. It can be seen that it the previously described pivot assembly 60, the top cap assembly 40 and a variation of the bottom cap assembly 20 which, as illustrated, presents similar alike features as the ones described for exemplary embodiment 200 but for the moon shaped indicia, here it may be replaced for a sun shaped indicia as illustrated. Case dependent, medicament may be administered at different intervals, by presenting two variations of the single dose design, the present invention can adapt to various administration necessities.

Figure 11:
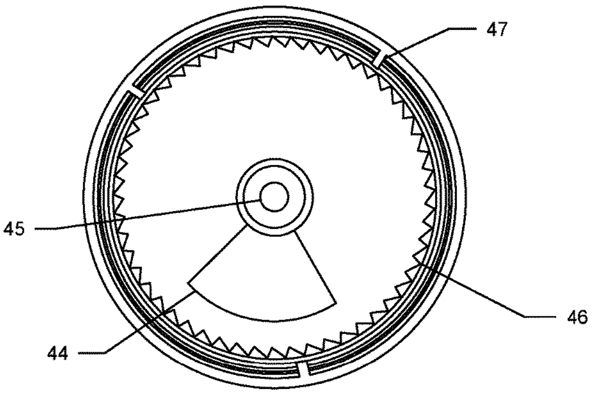
FIG. 11 represents a bottom view of the bottom cap in accordance with exemplary embodiment 300 of the present invention.
Figure 12:
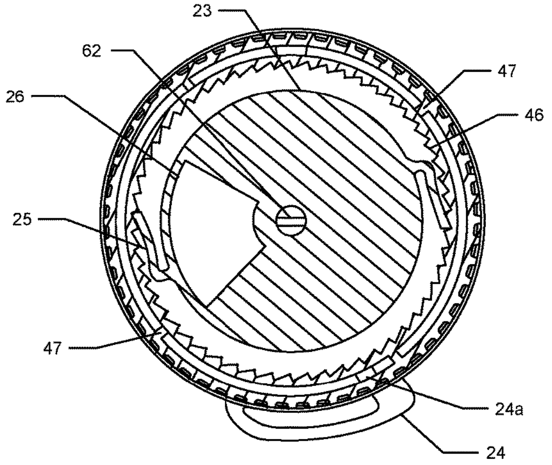
FIG. 12 illustrates a bottom perspective view of the interaction of the bottom cap assembly with the top cap assembly when ensembled in accordance with exemplary embodiment 300 of the present invention.

FIGS. 10-11 illustrate an internal variation of the present invention in accordance with exemplary embodiments 200 and 300. As described for embodiment 10, the number stops 47 internally disposed in the top cap 42 may be related with the number of independent at least one dosing aperture 26 and independent dosage regimen indicia 29 exhibited thereon. In the exemplary embodiments 200 and 300 the present invention may show two opened configurations and one closed configuration, thus the top cap 42 may have three stops 47 evenly distanced one another to permit the alignment of the dispensing opening 44 with one of the dosage regimen indicia 29 or dosing aperture 26 when the lever arm 24*a* is engaged with one of the stops 47. The interaction of the ratchet gear 46 with the pawls 25 is the same as previously described for FIG. 7.

The present invention in its various embodiments previously described may be manufactured in glow-in-the-dark material, as known in the art, if required since the use of various materials does not change the structural features of the invention but provides additional benefits thereto. The present invention in its various embodiments may also exhibit cancer color coding if required. The indicia described in the various embodiments of the present invention may be included using various methods as known in the art such as, but not limited to, heat-stamped method on its respective symbol with luminescence/phosphorescence material mixtures such as, but not limited to, zinc sulfide, sodium, strontium aluminate, and/or any variation thereof as known in the art.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A child safety device for a medication dispenser, comprising:

a bottom cap assembly including a base portion and an upper portion, the base portion is capable of being secured to a top of the medication dispenser, a push button has a distal end that is operatively connected to the base portion, at an opposite end the push button may include a lever arm, said lever arm is configured to be pushed inward, the upper portion further includes pawls located about a periphery thereof, on a top surface of the upper portion there is at least one dosing aperture, dosage regimen indicia, and a central opening;

a top cap assembly including a top cap that is received by the upper portion, on an uppermost surface the top cap includes a dispensing opening and a top opening which is centered thereon, the top cap includes a lateral wall, about an interior surface of the lateral wall the top cap includes a a ratchet gear and stops, wherein each of the stops is aligned with a position of the at least one dosing aperture and the dosage regimen indicia;

a pivot assembly including a pivot tip configured to movably secure the top cap with bottom cap assembly while acting as an axle about which the top cap rotates, said pivot tip is to be inserted through the top opening and the central opening, the top cap is blocked from rotating in any direction when the lever arm hits one of the stops, wherein said lever arm is enclosed by the top cap, the lever arm is capable of being disengaged from the stops by pressing the push button inwards; and the ratchet gear interacts with said pawls to permit the top cap to solely rotate in one direction, be it clockwise or counterclockwise depending on a geometry of the ratchet gear and a direction that the pawls face.

2. The child safety device for medication dispenser of claim 1, wherein said upper portion has a smaller diameter than a diameter of the base portion.

3. The child safety device for medication dispenser of claim 1, wherein an opened configuration is defined when the dispensing opening aligns with one of the at least one dosing aperture.

4. The child safety device for medication dispenser of claim 1, wherein a closed configuration is defined when the dispensing opening aligns with one of the dosage regimen indicia.

5. The child safety device for medication dispenser of claim 1, wherein the number of stops is directly related to the number of said at least one dosing aperture and dosage regimen indicia.

6. The child safety device for medication dispenser of claim 5, wherein each stop is disposed to permit an alignment of the dispensing opening with one of the at least one dosing aperture or one of the dosage regimen indicia, the alignment is achieved when the lever arm hits one of the stops.

7. The child safety device for medication dispenser of claim 1, wherein said at least one dosing aperture having an additional dosing aperture are located 180 degrees across from one another.

8. The child safety device for medication dispenser of claim 7, wherein said dosage regimen indicia is located 180 degrees across from one another and with a 90 degree offset with respect to the at least one dosing aperture.

9. The child safety device for medication dispenser of claim 6, wherein when said dispensing aperture is aligned, the top cap is immobile due to the lever arm hitting one of the stops and the ratchet gear in conjunction with the pawls that impedes the top cap to rotate in opposite direction.

10. The child safety device for medication dispenser of claim 1, wherein said top cap further includes indicia upon said uppermost surface configured to indicate the direction in which the top cap is capable of rotate due to the geometry of the ratchet gear.

11. The child safety device for medication dispenser of claim 1, wherein said dosage regimen indicia is a pictorial representation that conveys different day times be it a sun, a moon, and/or abbreviations such as AM/PM/X.

12. A child safety device for a medication dispenser, comprising:

a bottom cap assembly including a base portion and an upper portion, the base portion is capable of being secured to the top of a medication dispenser, about an external surface the base portion includes slots, a push button is operatively connected to the base portion at a distal end a thereof, on an opposite end the push button includes a lever arm, said lever arm is aligned with one of the slots so that it can be pushed inward, the upper portion further includes pawls located about a periphery thereof, on a top surface of the upper portion there is at least one dosing aperture, dosage regimen indicia, and a central opening, said upper portion has a smaller diameter than a diameter of the base portion;

a top cap assembly including a top cap that is received by the upper portion, on an uppermost surface the top cap includes a dispensing opening and a top opening which is centered thereon, the top cap includes a lateral wall, about an interior surface of the lateral wall the top cap includes a a ratchet gear and stops, wherein each of the stops is aligned with a position of the at least one dosing aperture and the dosage regimen indicia, when said top cap is mounted onto said upper portion the central opening is flush with the top opening, the dispensing opening aligns with one of the dosage regimen indicia or said at least one dosing aperture when the top cap rotates, wherein an opened configuration is defined when the dispensing opening aligns with one of the at least one dosing aperture, wherein a closed configuration is defined when the dispensing opening aligns with one of the dosage regimen indicia;

a pivot assembly including a pivot tip configured to movably secure the top cap with bottom cap assembly while acting as an axle about which the top cap rotates, said pivot tip is to be inserted through the top opening and the central opening; and when in one of the opened or closed configuration, the top cap is blocked from rotating in any direction when the lever arm, wherein said lever arm is enclosed by the top cap, hits the stops, the lever arm is capable of being disengaged from the stops by pressing the push button inwards, and thereby is configured to permit a user to rotate the top cap in a direction allowed by a geometry of the ratchet gear.

13. The child safety device for medication dispenser of claim 12, wherein said dosage regimen indicia is located 180 degrees across from one another and with a 90 degree offset with respect to the at least one dosing aperture.

14. The child safety device for medication dispenser of claim 12, wherein said dosage regimen indicia is a pictorial representation that conveys different day times be it a sun, a moon, and/or abbreviations such as AM/PM/X.

15. A child safety device for a medication dispenser, consisting of:

a bottom cap assembly including a base portion and an upper portion, the base portion is capable of being secured to a top of the medication dispenser, about an external surface the base portion includes slots, a push button is operatively connected to the base portion at a distal end thereof, on an opposite end the push button may include a lever arm, said lever arm is aligned with one of the slots so that it can be pushed inward, the upper portion further includes pawls located about a periphery thereof, on a top surface of the upper portion there is at least one dosing aperture, dosage regimen indicia, and a central opening, said upper portion has a smaller diameter than a diameter of the base portion;

a top cap assembly including a top cap that is received by the upper portion, on an uppermost surface the top cap includes a dispensing opening and a top opening which is centered thereon, the top cap includes a lateral wall, said lateral wall exhibits a series of ridges disposed perpendicularly that follow a circular pattern about an external surface, about an interior surface of the lateral wall the top cap includes a ratchet gear and stops, wherein each of the stops is aligned with a position of the at least one dosing aperture and the dosage regimen indicia, when said top cap is mounted onto said upper portion the central opening is flush with the top opening, the dispensing opening aligns with one of the dosage regimen indicia or at least one dosing aperture when the top cap rotates, wherein an opened configuration is defined when the dispensing opening aligns with one of the at least one dosing aperture, wherein a closed configuration is defined when the dispensing opening aligns with one of the dosage regimen indicia;

a pivot assembly including a pivot tip configured to movably secure the top cap with bottom cap assembly while acting as an axle about which the top cap rotates, said pivot tip is to be inserted through the top opening and the central opening; and when in one of the opened or closed configuration, the top cap is blocked from rotating in any direction when the lever arm, wherein said lever arm is enclosed by the top cap, hits the stops, the lever arm is capable of being disengaged from the stops by pressing the push button inwards, and thereby is configured to permit a user to rotate the top cap in a direction allowed by a geometry of the ratchet gear.

16. The child safety device for medication dispenser of claim 15, wherein said dosage regimen indicia is a pictorial representation that conveys different day times be it a sun, a moon, and/or abbreviations such as AM/PM/X.

* * * * *